US012596822B2

(12) United States Patent
Laslo et al.

(10) Patent No.: US 12,596,822 B2
(45) Date of Patent: Apr. 7, 2026

(54) PROTECTION OF SECURE VIDEO CONTENT FROM MALICIOUS PROCESSING IN THE DISPLAY PIPELINE

(71) Applicant: Microsoft Technology Licensing, LLC, Redmond, WA (US)

(72) Inventors: Ori Laslo, Rehovot (IL); Orr Srour, Rama Hasharon (IL); Matthew Morris, Seattle, WA (US); Steve M. Pronovost, Kirkland, WA (US); Glenn F. Evans, Kirkland, WA (US); Vadim Makhervaks, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 258 days.

(21) Appl. No.: 18/323,926

(22) Filed: May 25, 2023

(65) Prior Publication Data

US 2024/0394388 A1     Nov. 28, 2024

(51) Int. Cl.
| | |
|---|---|
| *H04L 29/06* | (2006.01) |
| *G06F 3/14* | (2006.01) |
| *G06F 21/62* | (2013.01) |
| *H04L 9/08* | (2006.01) |

(52) U.S. Cl.
CPC ............ *G06F 21/6209* (2013.01); *G06F 3/14* (2013.01); *H04L 9/0819* (2013.01); *G06F 2221/2141* (2013.01)

(58) Field of Classification Search
CPC ......... G06F 21/6209; G06F 2221/2141; G06F 3/14; H04L 9/0819
See application file for complete search history.

(56) References Cited

U.S. PATENT DOCUMENTS

| | | | | |
|---|---|---|---|---|
| 2007/0043667 A1* | 2/2007 | Qawami | .......... | G11B 20/00724 |
| | | | | 705/50 |
| 2011/0162075 A1 | 6/2011 | Lin | | |
| 2022/0035751 A1* | 2/2022 | Chang | .................... | G06F 21/78 |

OTHER PUBLICATIONS

International Search Report and Written Opinion received for PCT Application No. PCT/US2024/026927 Jul. 26, 2024, 12 pages.
International Preliminary Report on Patentability (Chapter I) received for PCT Application No. PCT/US2024/026927, mailed on Dec. 4, 2025, 7 pages.

* cited by examiner

*Primary Examiner* — Evans Desrosiers

(57)     ABSTRACT

A memory where video content is stored for access by processing components in a display pipeline is divided into different categories or groupings, each different category or grouping corresponding to a different security level. Access, by the processing components in the display pipeline, to the video content stored in the different categories or groupings is restricted in different ways so that access to video content stored in the highest security categories or groupings is more restricted and more secure than access to the video content stored in a less secure categories or groupings. Video content is received and a security level corresponding to video content is identified. The video content is written into a memory category or grouping, of the plurality of different categories or groupings corresponding to a plurality of different security levels, based upon the security level corresponding to the video content.

20 Claims, 10 Drawing Sheets

PROTECTION OF SECURE VIDEO CONTENT FROM MALICIOUS PROCESSING IN THE DISPLAY PIPELINE

BACKGROUND

Computing systems are currently in wide use. Some computing systems host or distribute applications that are accessed by end users to display video content. The hosted or distributed applications may provide a wide variety of different types of functionality with respect to the video content.

When the video content is received on an edge device (which is an endpoint on a network over which the video content is transmitted), the video content often undergoes processing by components in a display pipeline. For instance, the video content may be written into a memory that stores the video content, and where the video content can be accessed by hardware processing components in the display pipeline. The hardware processing components may include, for instance, a decoder that decodes compressed video, a central processing unit that may run code on the decoded video content, a three-dimensional (3D) processor that incorporates 3D effects into the video content, a neural processing unit (NPU) that performs functions such as eye tracking, framing, dynamic blurring, etc., and a video processing engine (VPE) which may perform additional video processing steps on the video content (such as scaling, rotations, mirroring, color space conversions, two dimensional composition, etc.) so that the processed video content can be fetched by a compositor system.

The compositor system writes to an offscreen display buffer for the various windows which are to be rendered and then generates a composite of all of the windows in the different buffers to obtain an image indicative of how the content will be displayed on the screen. That image is then scanned out to a display screen.

The discussion above is merely provided for general background information and is not intended to be used as an aid in determining the scope of the claimed subject matter.

SUMMARY

A memory where video content is stored for access by processing components in a display pipeline is divided into different categories or groupings, each different category or grouping corresponding to a different security level. Access, by the processing components in the display pipeline, to the video content stored in the different categories or groupings is restricted in different ways so that access to video content stored in the highest security categories or groupings is more restricted and more secure than access to the video content stored in a less secure categories or groupings. Video content is received and a security level corresponding to video content is identified. The video content is written into a memory category or grouping, of the plurality of different categories or groupings corresponding to a plurality of different security levels, based upon the security level corresponding to the video content.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
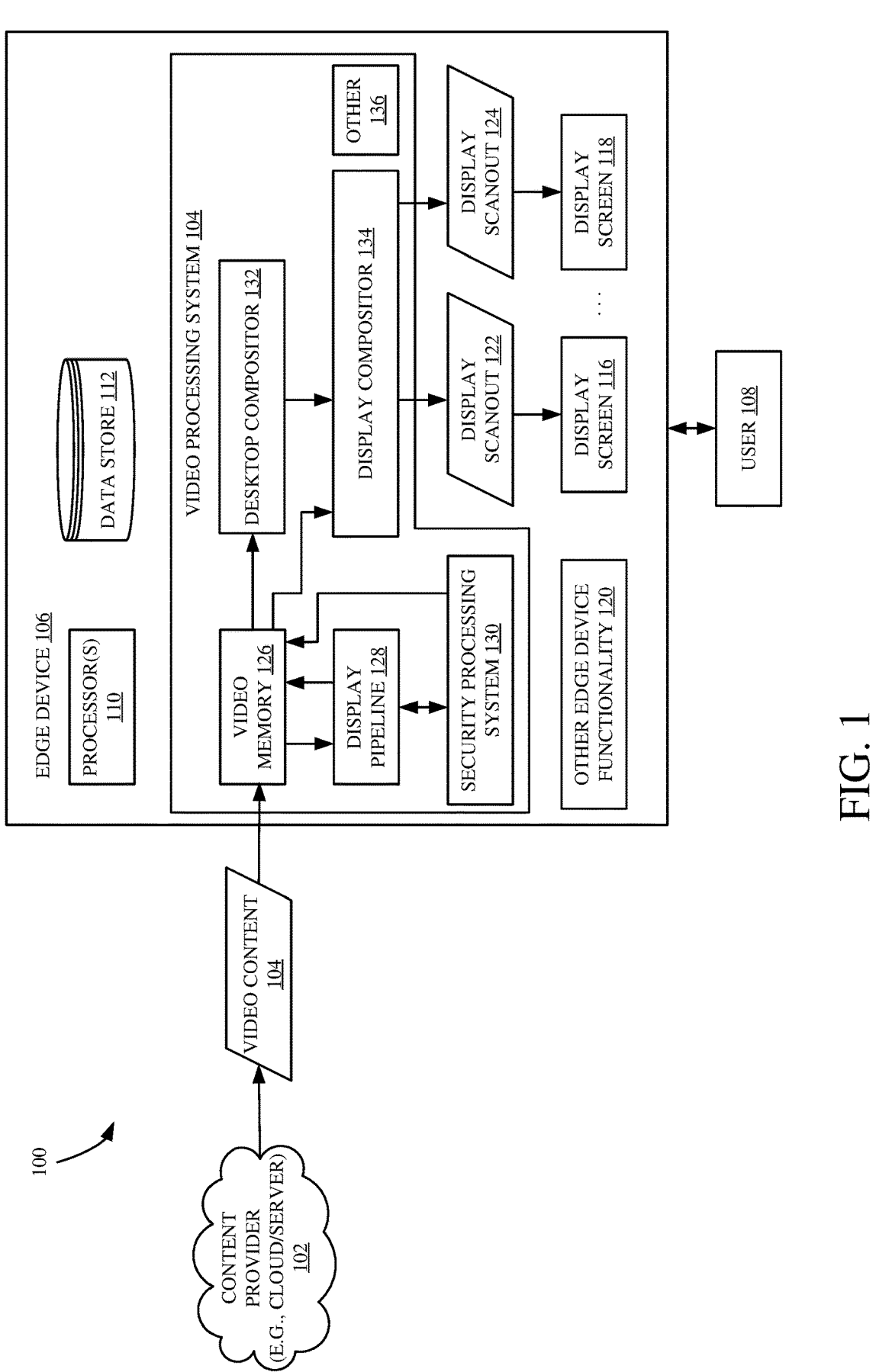
FIG. 1 is a block diagram of one example of a computing system architecture.

As discussed above, when video content is sent from a content provider to an edge device, the video content is normally stored in a memory where it can be accessed by hardware components in a display pipeline in order to process the video content for display. In some current systems, the video content is often processed by a digital rights management (DRM) hardware processing system which attempts to prevent surreptitious access to the video content. For instance, the DRM hardware attempts to prevent a user or malicious code running on the edge device from having access to the video content.

The DRM hardware often includes memory that is protected, which holds secure video content, as that content is processed through the display pipeline. Access to the protected memory is only allowed to certain specific hardware processing components. For instance, a graphics processor may have access to the video content stored in the protected memory.

However, some scenarios allow code to be executed on the frame buffers (such as by a central processing unit-CPU) where the video content is stored before being scanned out to a display device. One example of such code may include a shader which is a microcode program run on a three dimensional (3D) digital signal processing engine that calculates the appropriate levels of light and darkness and color in a display. Another example of such code may include high dynamic range (HDR) tone mapping which makes color adjustments with minor light/dark adjustments. These are just two examples of code that may be run on the secure video content before it is displayed.

In order to run these types of code, the CPU or operating system has the ability to instruct the graphics processor to run this code on the secure content. This can compromise the security of the secured video content. For instance, if a user or CPU is compromised, the compromised user or CPU may request any code to be run by the graphics processor, without ensuring the code's integrity. Because the graphics processor is one of the hardware components that has access to the secure content, the graphics processor can manipulate that content at will.

In some examples, the graphics processor is limited to writing back the results of the processing only to the secured memory. Therefore, while the CPU cannot direct the graphics processor to execute code that moves the secure content out of the secured memory, the code may still be used to leak information about the secure content by means of side channel attacks. Examples of such attacks include leaking information based upon the pixel value and the location of those pixels, leaking information indicative of when the secured content has been written to and changed, adding delays to the write operations back to the protected memory based upon the pixel values so that the CPU may monitor the write operations and obtain information about the frame based upon the timing corresponding to the write operations, or performing deliberate cache misses based upon the pixel values so that information about those pixel values can be obtained by monitoring the cache misses.

While this level of security may be acceptable in some scenarios, there are scenarios where the rate of information leak allowed by such attacks is unacceptable and instead, security is desired which lowers the rate of data leaks. For example, some productivity scenarios display highly confidential documents. Text from confidential documents may be leaked at an undesirably high rate using these types of side channel attacks, and therefore enhanced security is desired.

The present discussion thus proceeds with respect to a system which includes additional secured memory categories in the memory where the secure video content is stored during processing by components in the display pipeline. The secure video content may have a particular security level (such as high security, mid-level security, unsecured) and when the video content is downloaded from a source, the video content could be stored in a memory location based upon its security level. The processing components in the display pipeline have restricted access to the memory so that only certain processing components have access to the memory categories corresponding to the highest security level. Additional processing components may have access to the video content stored in the memory categories corresponding to the mid-level of security, and all of the processing components may have access to the video content stored in the memory categories corresponding to unsecured content.

In addition, encryption may be used to further limit access to the video content, based upon its security level. For instance, the secure video content may be encrypted and access to the encryption key is controlled so that only certain components in the display pipeline have access to the encryption key.

In addition, the present discussion proceeds with respect to a system that maintains the secure content in two different frame buffers. A first frame buffer contains the secure content so that when the secure content is to be in focus on a display, the data can be fetched from the first frame buffer. A second or placeholder frame buffer is also maintained. The placeholder frame buffer contains data that will be displayed when the secure content is not in focus on the display. The placeholder frame buffer is not in the secured memory category (which can be a category corresponding to a specific memory location or a category defined in another way) so that all of the hardware processing components may have access to the placeholder frame buffer. This will allow for additional processing to be performed (such as shaders) which will allow for additional effects (such as animations, 3D effects, etc.) on the data in the placeholder frame buffer.

This greatly enhances the security of highly secure video content. While the video processing operations that can be performed on that content is limited relative to unsecure content, this type of limitation is often acceptable in scenarios where highly secure content is being viewed, such as in productivity scenarios.

FIG. 1 is a block diagram of one example of a computing system architecture 100. Computing system architecture 100 shows that a content provider 102 (which may be located in the cloud or in another remote server environment or elsewhere) provides video content 104 to an edge device 106 at the request of an application, to be viewed by a user 108. Edge device 106 can include one or more processors or servers 110, data store 112, video processing system 114, a plurality of display screens 116-118, and a wide variety of other edge device functionality 120. The video content 104 is processed by video processing system 114 to generate a plurality of display scanouts 122-124 which can be displayed on display screens 116-118, respectively.

In the example shown in FIG. 1, video processing system 114 includes video memory 126, display pipeline 128, security processing system 130, desktop compositor 132, display compositor 134, and system 114 can include other items 136 as well. Before describing the overall operation of architecture 100, a description of some of the items in architecture 100, and their operation, will first be provided.

In the example shown in FIG. 1, user 108 may actuate an application or another system to view video content 104. Video content 104 is illustratively marked with a security level so that different portions of video content 104 may be highly secure, while other portions have a mid-level (or medium level) security while still other portions have a low level security or are unsecure.

Security processing system 130 configures video memory 126 into different memory categories (e.g., sections, areas, or other categories) corresponding to different security levels. Therefore, video content 104 that is highly secure is stored in a corresponding category in video memory 126 which is configured to store highly secure content. Mid-level security video content is stored in a category in video memory 126 that is configured to store video content having a med-level security, and unsecure video content is stored in a category of video memory 126 that is configured to store unsecure content.

Display pipeline 128 includes a plurality of different hardware processing components (and possibly software or firmware processing components as well) that access the video content in video memory 126 and perform processing on that video content so that the video content can ultimately be accessed by desktop compositor 132, and display compositor 134, and displayed. Desktop compositor 132 can generate a single frame from information in multiple frame buffers, and display compositor 134 can add additional multiplane overlay (MPO) buffers that it may choose to add. Security processing system 130 restricts access of different components in display pipeline 128 to the content in video memory 126 based upon the security level of that content (and thus based upon the category or location in memory 126 where the content is stored). Therefore, in one example, security processing system 130 allows all of the components in display pipeline 128 and outside the display pipeline 128 to access video content stored in the memory category or location corresponding to unsecure content. Security processing system 130 restricts access of components in display pipeline 128 to the video content stored in the memory location corresponding to mid-level security so that only a first subset of those components (e.g., more secure components that are running more secure code) can access the video content that has mid-level security. Security processing system 130 further restricts the access by components in display pipeline 128 to the video content stored in the location in memory 126 corresponding to high level security video content. Therefore, only a second subset including the most secure components in display pipeline 128 can perform only the most secure operations on the video content stored in the location in memory 126 corresponding to the highest security level.

Once the video content is fully processed by display pipeline 128, desktop compositor 132 can generate a single frame from multiple frame buffers (e.g., from each window that is to hold content for display). Display compositor 134 then generates a composite of all of the buffers for all of the windows and any additional MPO buffers together to obtain an image that can be displayed on the display screens 116-118. That image may be written to a relatively small internal memory so that display compositor 134 generates display scanout 122 from the memory corresponding to display screen 116 and generates display scanout 124 from the memory corresponding to display screen 116.

Security processing system 130 can also configure components in display pipeline 128 to highlight secure content when it is displayed on one of the display screens 116-118 so that the secure content can easily be identified by user 108. Also, security processing system 130 can configure components in display pipeline 128 to maintain multiple different frame buffers. A first frame buffer is stored in a secure category or location in memory 126, and a second (or placeholder) frame buffer is stored in an unsecure category or location in memory 126. When secure content is to be displayed, the frame buffer is read out of the secure category or location in memory 126 where the frame buffer holds the secure video content for display. When secure content is not to be displayed, the data can be read out of the placeholder frame buffer in the unsecure category or location of memory 126, where the placeholder frame buffer obscures or covers or replaces the secure content on the display.

Figure 2:
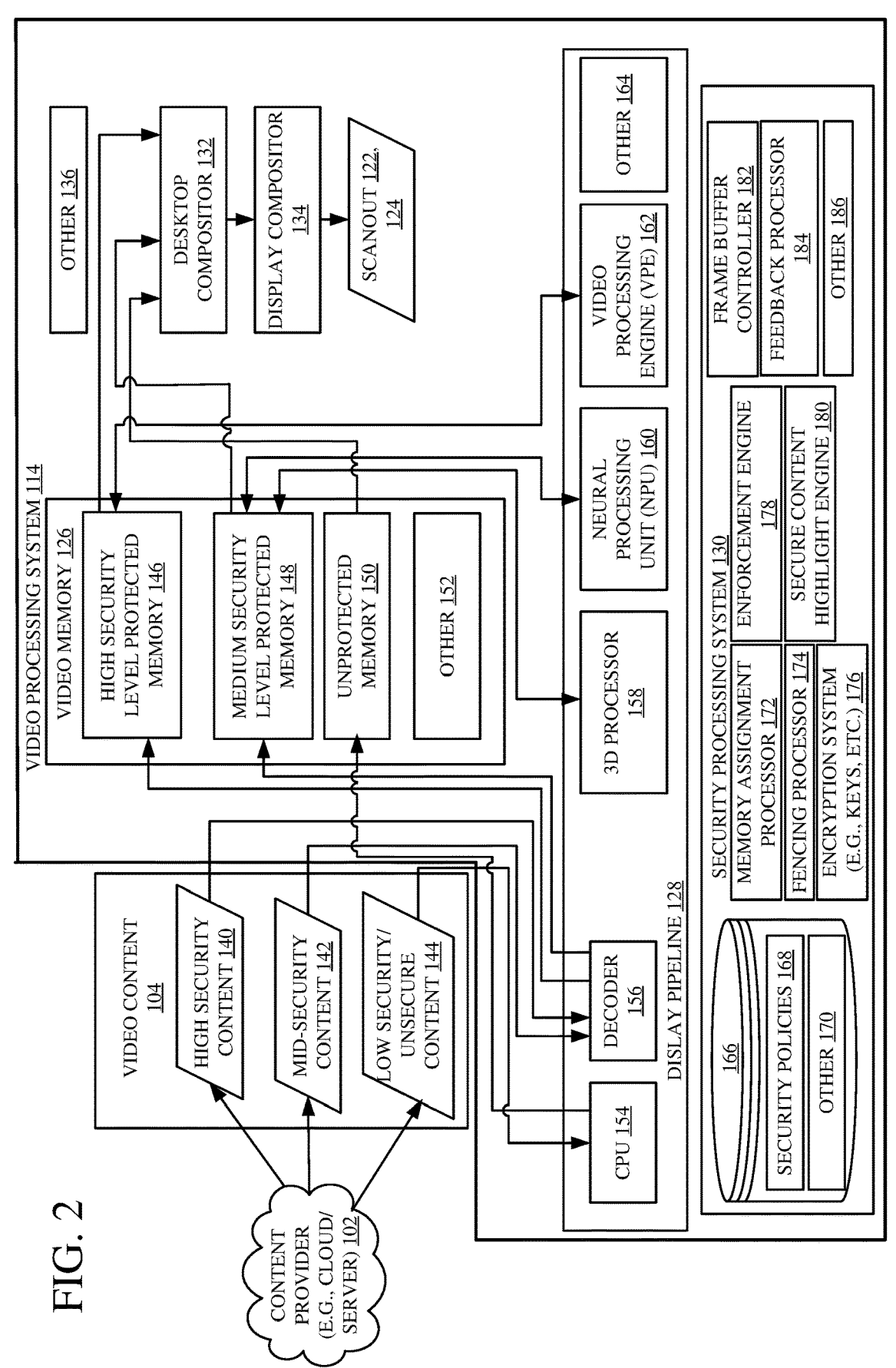
FIG. 2 is a block diagram showing one example of the computing system architecture illustrated in FIG. 1, in more detail.

FIG. 2 is a block diagram showing some portions of architecture 100 (illustrated in FIG. 1) in more detail. Items that are similar to those shown in FIG. 1 are correspondingly numbered in FIG. 2. FIG. 2 shows that video content 104 includes high security content 140, mid-security content 142, and low security/unsecured content 144. FIG. 2 also shows that, in one example, video memory 126 can include high security level protected memory 146, medium security level protected memory 148, unprotected memory 150, and other memory 152. Also, in the example shown in FIG. 2, display pipeline 128 can include central processing unit (CPU) 154, decoder 156, three-dimension (3D) processor 158, neural processing unit (NPU) 160, video processing engine (VPE) 162, and other items 164. FIG. 2 also shows that, in one example, security processing system 130 can include security policy data store 166 (that stores security policies 168 and other items 170), memory assignment processor 172, fencing processor 174, encryption system 176, enforcement engine 178, secure content highlight engine 180, frame buffer controller 182, feedback processor 184, and other items 186.

It will be noted that video content 104 can be divided into content having the various security levels 140-144 in a variety of different ways. The video content can be marked as high security, mid security, and low security/unsecured using markers, or in other ways. It will also be noted that there may be a larger number of security levels (instead of just high, mid, and low) but the three different security levels are described herein for the sake of example only.

Fencing processor 174 in security processing system 130 (which can work in tandem with encryption system 176 described below) divides memory 126 into fenced categories or regions by configuring the video memory 126 into different memory categories or regions corresponding to the high security level protected memory 146, medium security level protected memory 148, and unprotected memory 150. Again, it will be appreciated that if video content 104 may have more than three security levels, then video memory 126 may be divided into the same or different number of memory categories or regions so that at least one memory category or region in video memory 126 corresponds to each of the security levels into which video content 104 is divided. Fencing processor 174 may access security policies 168 which define the number of security levels, and configure memory 126 accordingly.

The security policies 168 may also define which components in display pipeline 128 have access to which of the different memory categories or locations 146, 148, and 150 (or to video content of different security levels). Similarly, security policies 168 may define which operations the components in display pipeline 128 may perform on the content stored in the different memory categories or locations 146, 148, and 150 (or on content having the different security levels). Fencing processor 174 then configures the components in display pipeline 128 so that access to the content in the different memory categories or locations is restricted based on the security policies 168. For example, a virtual fence may be set up so access to the different memory categories or locations is restricted to any desired components in display pipeline 128.

Encryption system 176 may include encryption keys and other information or components that are used to encrypt and decrypt the content stored in the different memory categories or locations in memory 126. For instance, an encryption key (which may be a specific session key corresponding to a virtual desktop session) can be used to access and decrypt data in the different memory categories or locations. Encryption system 176 may store this key and only allow certain processing components in display pipeline 128 to access the key to enforce access restrictions to secure data, as indicated by policies 168 or as indicated elsewhere.

Enforcement engine 178 then enforces the access restrictions configured by security processing system 140. Therefore, enforcement engine 178 may restrict or block access of the different components in display pipeline 128 based upon the memory category or location and security level of the content that those components are attempting to access. Similarly, enforcement engine 178 may restrict or block the operations that can be performed by the different components in display pipeline 128 on the content in the different memory categories or locations in memory 126.

Secure content highlight engine 180 may configure video processing engine 162 or the compositors 132 and/or 134 to generate visual indicia on the display screens 116-118 that indicate when secure content is being displayed and highlight the secure content on the display. For instance, the displayed content that is unsecure may be greyed out on the display so that the secure content is highlighted. In another example, the cursor may be controlled to change appearance when the cursor hovers or travels over secure content on the display as opposed to when it is traveling over or hovering over unsecure content. Other visual indicia can be generated as well, in order to indicate that secure content is being displayed on the display, and to highlight the location on the display where the secure content is being displayed.

Frame buffer controller 182 controls whether data is read out of the normal frame buffer (which may contain secure data) or the placeholder frame buffer (which obscures or replaces the secure data on the display).

Briefly, in operation, video content 104 has sections that are marked as high security content 140, mid-security content 142, and low security/unsecure content 144. Memory assignment processor 172 detects the security level of the content and assigns the video content 104 to the different categories or locations in video memory 126 based upon the security level of the content 104 that is being received. Memory assignment processor 172 stores high security content 140 in high security level protected memory 146. Memory assignment processor 172 stores mid-security content 142 in medium security level protected memory 148, and stores low security/unsecure content 144 to unprotected memory 150.

The components in display pipeline 128 then access the content in video memory 126 to perform processing on that content. The processed content is stored back to memory 126. Desktop compositor 132 and display compositor 134 fetch the processed data and composites the images and generates the display scanouts 122 and 124 for display on display screens 116 and 118.

It will be noted that the arrows from the components in display pipeline 128 to the different memory categories or locations in video memory 126 are only examples and indicate the highest or most secured memory categories or locations to which the components in display pipeline 128 have access. Therefore, for instance, 3D processor 158 has an arrow which extends to the medium security level protected memory 148. This is because processor 158 does not have access to the high security level protected memory 146. However, 3D processor 158 also has access to unprotected memory 150, although the arrow between 3D processor 158 and unprotected memory 150 is not shown, for the sake of clarity. Also, NPU 160 has an arrow to the medium security level protected memory 148. This means that NPU 160 has access to the content in both the medium security level protected memory 148 and unprotected memory 150, but NPU 160 does not have access to the content of high security level protected memory 146. Similarly, VPE 162 has an arrow connecting to high security level protected memory 146. This means that VPE 162 has access to the content of all three memory sections 146, 148, and 150 although only the arrow to the highest security level protected memory 146 is shown, again for the sake of clarity.

In the example shown in FIG. 2. CPU 154 can perform processing on low security/unsecure content 144 and write the processed content back to unprotected memory 150. Decoder 156 can decode compressed video content 104 and write it to all of the different memory categories or locations in video memory 126 (e.g., high security content 140 can be decoded and decompressed and written by decoder 156 into high security level protected memory 146 mid-security content 142 can be decoded or decompressed by decoder 156 and written back to medium security level protected memory 148, and low security/unsecure content 144 can also be decoded or decompressed by decoder 156 and written to unprotected memory 150).

Encryption system 176 also encrypts (or controls encryption of) data that is stored in video memory 126 based upon the security policies 168 and stores the encryption keys that are used by the components in display pipeline 128 to decrypt and process, and then re-encrypt the content.

The other processors 158 and 160 and video processing engine 162 then all perform the desired processing on the content in the different categories or locations in video memory 126 to which those processors 158, 160, and VPE

162 are allowed to access. Enforcement engine 178 enforces the access restrictions so that only the components of display pipeline 128 that are supposed to have access to the video content at the various categories or locations in memory 126 actually are permitted to have that access.

Frame buffer controller 182 maintains the two or more frame buffers (which may be in the different memory categories or locations 146, 148, and 150). When display pipeline 128 has completed processing the video content, display pipeline 128 generates a signal to desktop compositor 132 which generates a single frame out of several frame buffers (e.g., several windows). Display compositor 134 then generates a composite image based upon the frame generated by desktop compositor 132 and any additional MPO buffers it desires, to generate an image that is to be displayed on each of the display screens 116 and 118. Secure content highlight engine 182 controls the visual effects on the data in the display memory so that visual indicia is provided to the user 108 to indicate when secure content is being displayed and to highlight the location of that content on the display. Frame buffer controller 182 causes the data from the appropriate frame buffer to be accessed based upon whether the secure content is to be displayed or to be obscured or removed on the display.

In one example, a feedback signal can be provided from display compositor 134 or other components to feedback processor 184. The feedback signal may include information indicative whether the content being displayed is from the highly secure memory and whether the content is visible (e.g., it is displayed in a large enough window, it is displayed on top, etc.). Feedback processor 184 can then process that information and determine whether to notify the user that secure content is indeed, being displayed. If so, feedback processor 184 can generate an alert, or other action signal.

Figure 3A:
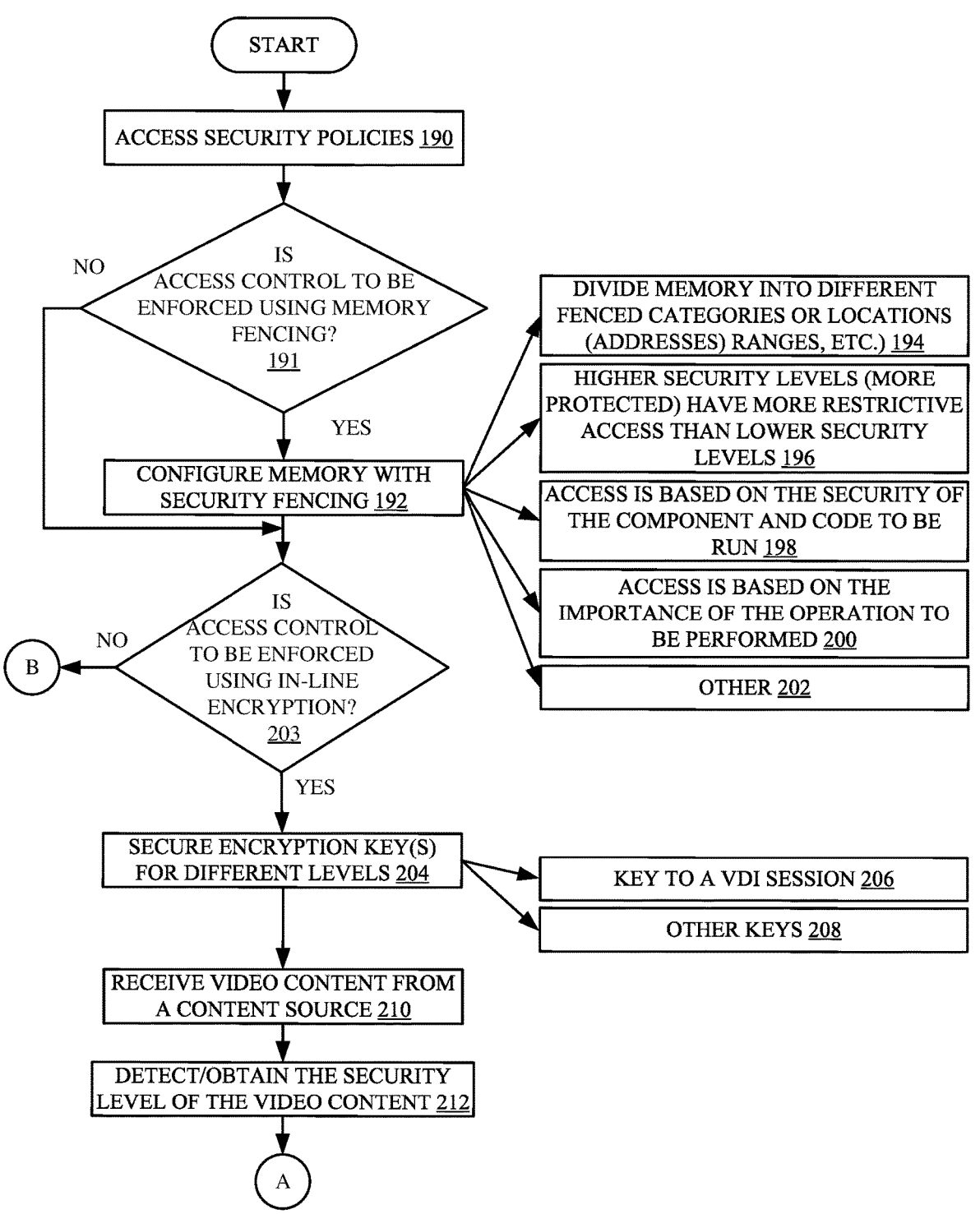
FIGS. 3A, 3B, and 3C (collectively referred to herein as FIG. 3) show one example of a flow diagram illustrating the operation of a computing system architecture.
Figure 3B:
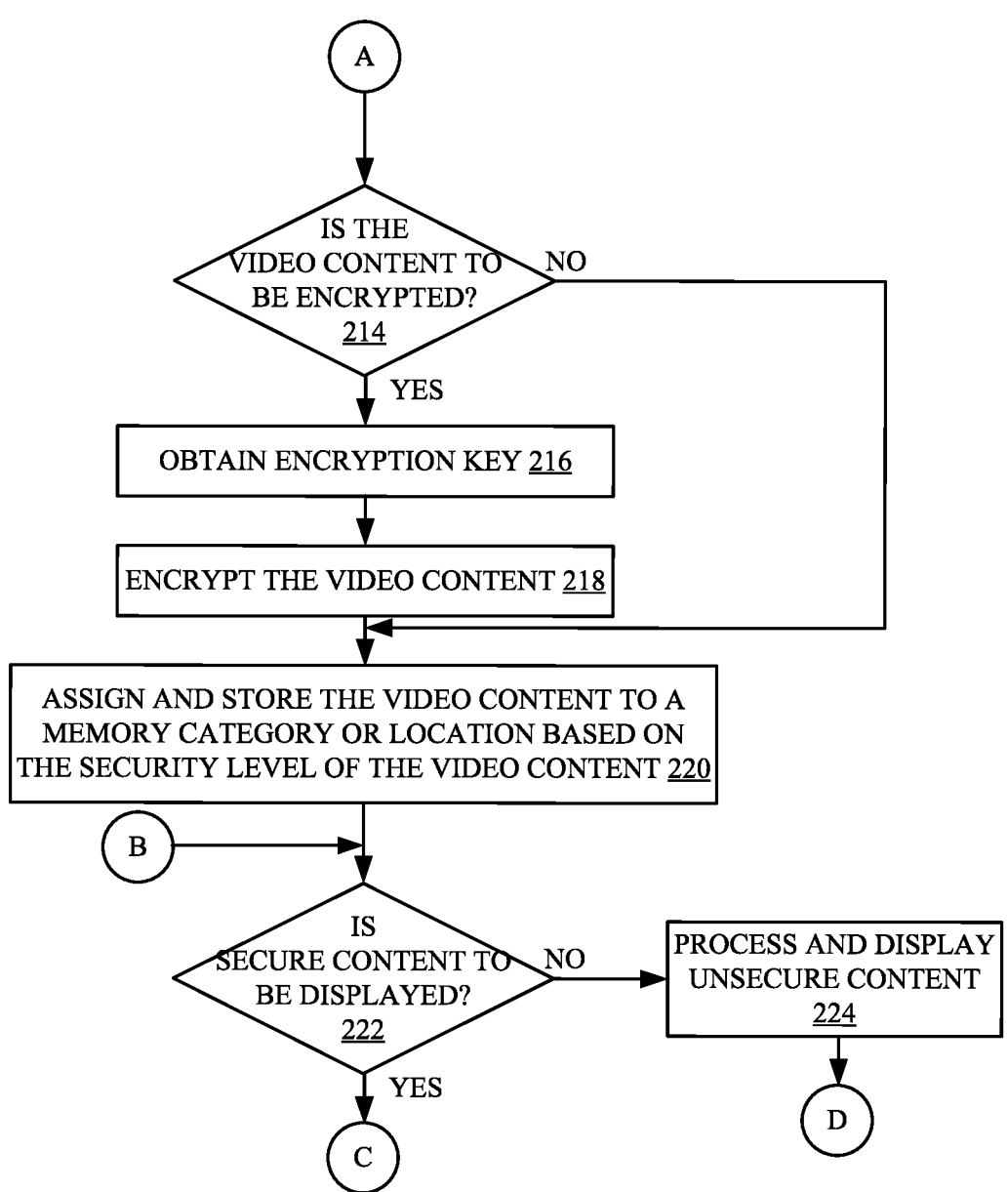
Figure 3C:
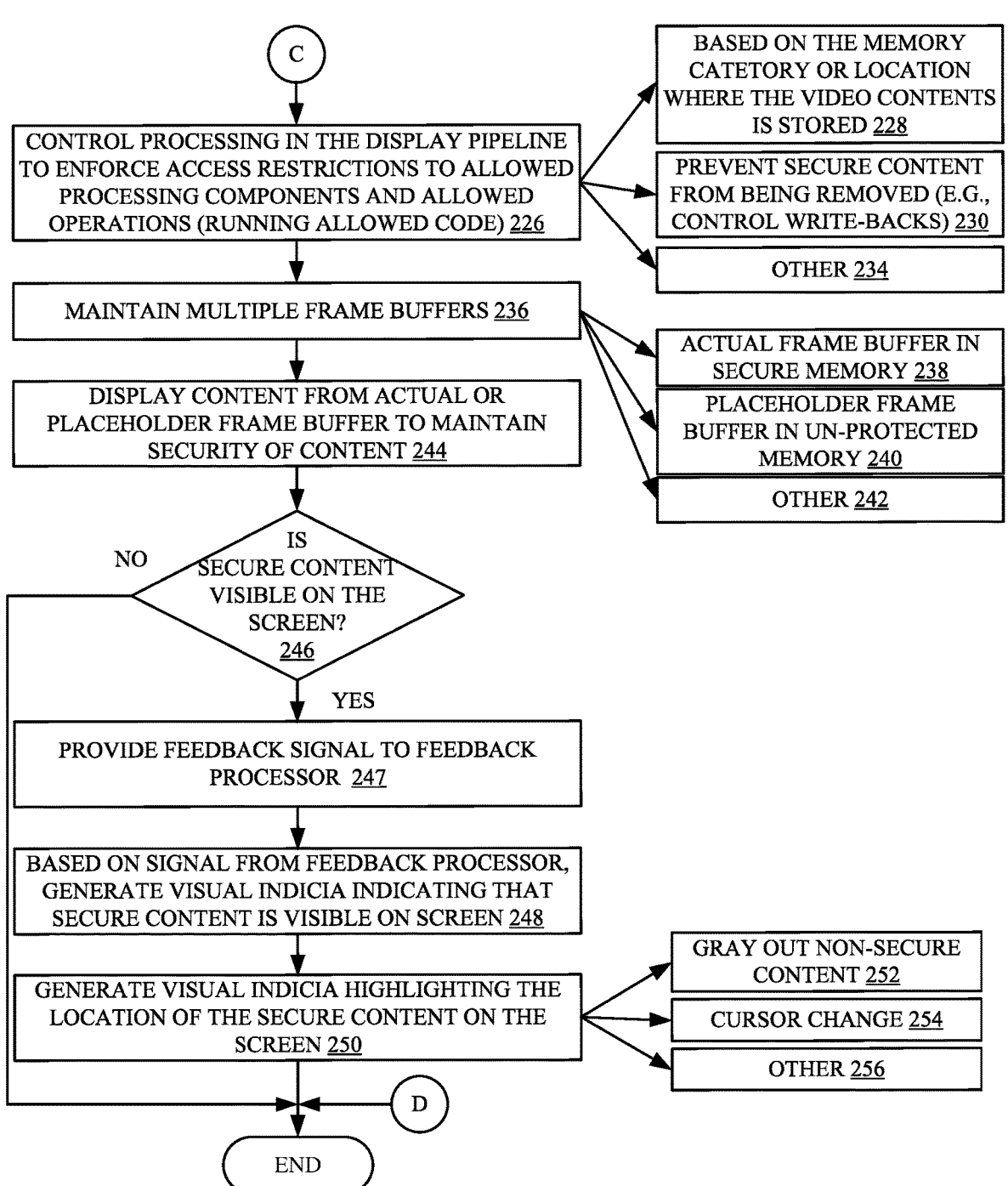

FIGS. 3A, 3B, and 3C (collectively referred to herein as FIG. 3) show a flow diagram illustrating one example of the operation of video processing system 114 in more detail. It is first assumed that security policies 168 have been loaded into or are otherwise accessible by security processing system 130. The secure content can be protected by fencing, encryption, both fencing and encryption, or in other ways. For purposes of the present description, it is assumed that both fencing and encryption are used. Therefore, at block 196, it is determined that memory fencing will be used. Fencing processor 174 accesses the security policies 168, as indicated by block 190 in the flow diagram of FIG. 3. Fencing processor 174 then configures video memory 126 with security fencing based upon the security policies 168. as indicated by block 192 in the flow diagram of FIG. 3. For instance, fencing processor 174 divides memory 126 into different fenced categories or locations (e.g., address ranges, etc.) 146, 148, and 150, as indicated by block 194. The higher security levels (or more protected levels) provide more restrictive access than the lower security levels (or less protected levels) as indicated by block 196.

Fencing processor 174 configures the memory 126 so that access of items in display pipeline 128 to the content stored in the memory categories or locations is based upon the security of the component in display pipeline 128 and the security of the code that that particular component is running, as indicated by block 198 in the flow diagram of FIG. 3. In one example, the access can also be based upon the importance of the operation to be performed by the particular component in display pipeline 128, as indicated by block 200 in the flow diagram of FIG. 3. For instance, it may be that substantially all video content 104 is compressed and must be decoded or decompressed before it can be consumed. In that case, the operation performed by decoder 156 may be highly important to consume the video content and therefore decoder 156 may have access to even the highest security level categories or locations in protected memory 146. However, shaders or other image processing functionality which may enhance the quality of the image but are not highly important in consuming the video content, may be less important and may therefore be restricted to be performed on video content stored in the lower security level memory categories or locations 148, 150, etc. Further, it will be noted that the particular operations that are important may be dependent on the scenario and user interface policies. There may be tradeoffs in which higher security is achieved at the cost of the user interface experience. These tradeoffs can be incorporated into the security policies 168 or defined in other ways. Fencing processor 174 can configure the video memory 126 in other ways, with additional security levels, etc., as indicated by block 202 in the flow diagram of FIG. 3.

In the present discussion, it is assumed that encryption will also be used to enforce security, as determined at block 203. Therefore, encryption system 176 obtains encryption keys for the different levels of memory 146 and 148, as those encryption keys are available and are needed. Securing the encryption keys for the different memory levels is indicated by block 204 in the flow diagram of FIG. 3. For example, the encryption keys may include a key that is specific to a virtual desktop session, as indicated by block 206, or other encryption keys, as indicated by block 208.

Once the memory 126 is configured, then video processing system 114 receives video content 104 to be processed. Receiving video content 104 from a content source 102 is indicated by block 210 in the flow diagram of FIG. 3. Memory assignment processor 172 then identifies (by detected or obtaining) the security level of the video content 104 being received, as indicated by block 212. For instance, the video content 104 may have one or more markers or identifiers that identify the video content as high security content 140, mid-security content 142, and/or low security/unsecure content 144, or content having another security level.

Encryption system 176 determines whether the video content is to be encrypted (or has been encrypted) based upon security policies 168 or based upon other information, as indicated by block 214 in the flow diagram of FIG. 3. If the video content is to be encrypted (or has been encrypted), then encryption system 176 obtains the encryption key. Obtaining the encryption key is indicated by block 216 and encrypting the video content is indicated by block 218 in the flow diagram of FIG. 3.

Memory assignment processor 172 then assigns the video content (either encrypted or unencrypted as desired) to a memory category or location in video memory 126 based upon the security level of the video content and stores the video content in the assigned category or location in memory 126. Assigning the video content to a memory category or location and storing the content in that category or location in memory 126 is indicated by block 220 in the flow diagram of FIG. 3.

If secure content is to be displayed, as determined at block 222 in FIG. 3, then enforcement engine 178 controls processing of the content by components in display pipeline 128 to enforce the access restrictions so that only allowed processing components in display pipeline 128 can perform allowed operations (e.g., run allowed code) on the content based upon the security level of the content and/or which category or location the content is stored in memory 126.

Controlling processing in the display pipeline 128 to enforce access restrictions is indicated by block 226 in the flow diagram of FIG. 3. Controlling access to the content based upon the category or memory location 146, 148, and/or 150 where the content is stored in memory 126 is indicated by block 228 in the flow diagram of FIG. 3.

Enforcement engine 178 can also enforce other restrictions, such as requiring that content that is processed from memory 126 is written back to the same security level category or location in memory 126 from which it was obtained. For instance, if highly secure content is obtained from protected memory 146 and processed, enforcement engine 178 may require that the result of that processing is written back to protected memory 146 as well. Controlling write-backs or other mechanisms to prevent removal of the secured content is indicated by block 230 in the flow diagram of FIG. 3. Enforcement engine 178 may also control the availability of encryption keys so that only processing components in display pipeline 128 that should have access to those encryption keys actually have access to them. Controlling the security of the content in memory 126 by controlling access to encryption keys is indicated by block 232 in the flow diagram of FIG. 3. Enforcement engine 178 can control processing in the display pipeline 128 to ensure security of content stored in memory 126 in other ways as well, as indicated by block 234 in the flow diagram of FIG. 3.

As discussed above, frame buffer controller 182 can be configured to control the components of display pipeline 128 and compositors 132 and 134 to maintain multiple frame buffers, as indicated by block 236. The multiple frame buffers can include an actual frame buffer in secure memory categories or locations 146 and/or 148, as indicated by block 238. The multiple frame buffers may also include a placeholder frame buffer in the unprotected memory 150, as indicated by block 240. The actual frame buffer may include secure content while the placeholder frame buffer may obscure or not include secure content. The multiple frame buffers can be maintained in other ways as well, as indicated by block 242 in the flow diagram of FIG. 3. When the content is displayed on display screens 116 and 118, the content from the actual or placeholder frame buffers can be displayed in order to maintain security of the secured content, as indicated by block 244. For instance, the compositors 132 and/or 134 or the video processing engine 162 may know if secure content is to be displayed, and then may control fetching of the content from the actual frame buffer or from the placeholder frame buffer. This is just one way that the content can be displayed from the multiple different frame buffers to maintain security of the content.

If secure content is to be visible on the screen (e.g., if data is fetched from the actual frame buffer), one or more feedback signals can also be provided to feedback processor 184. The feedback signals can be indicative of where the secure content is being displayed on the display screens. Therefore, the feedback signal may be provided from display pipeline 128, from desktop compositor 132, from display compositor 134, from display screens 116-118, or elsewhere. Providing a feedback signal to feedback processor 184 is indicated by block 258 in the flow diagram of FIG. 3. Feedback processor 184 can generate a signal to secure content highlight engine 180 which controls the display pipeline 128 and/or compositors 132 and 134 to generate visual indicia indicating that secure content is visible on the screen. Determining whether secure content is visible on the screen is indicated by block 246 in the flow diagram of FIG. 3, and, if so, generating the feedback signal to feedback processor 184 is indicated by block 247. Generating visual indicia indicating that the secure content is visible is indicated by block 248. For instance, the visual indicia may include an alert or other display element that is visible to user 108 when secure content is visible on the display screen. Based on the output from feedback processor 184, secure content highlight engine 180 also controls the display pipeline 128 and/or desktop compositors 132,134 to generate visual indicia highlighting the location of the secure content on the screen, as indicated by block 250 in the flow diagram of FIG. 3. For instance, the display can be generated so that the non-secure content is greyed out while the secure content is displayed in bold or with other visual indica to highlight its location on the screen, as indicated by block 252 in the flow diagram of FIG. 3. The display can be controlled so that the appearance of the cursor changes when the cursor hovers over or travels over the secured content, as indicated by block 254. Of course, there are wide variety of other visual indica that can be generated to highlight the location of the secure content on the display screen, as indicated by block 256 in the flow diagram of FIG. 3.

It can thus be seen that the present discussion describes a system which greatly enhances the security applied to secure video content. A plurality of different memory categories or locations are configured and access to those memory categories or locations is restricted based upon the security level of the video content stored in those memory categories or locations. The video content stored in the most secure memory category or locations may have the most restrictive access so that fewer video processing components have access to that content and/or so that the video processing components can run only highly secure code or perform highly secure operations on that video content. However, as the security level of the video content decreases, the video content can be stored in other memory categories or locations which have less restrictive access. Thus, more video processing components can access that video content and the video processing components can perform more operations on that video content. In addition, security is enhanced by showing the user visual indicia indicating that secure content is being displayed and highlighting the location of that secure content on the display. Similarly, a secure frame buffer and placeholder frame buffer are maintained so that, when secure content is not to be displayed, data from the placeholder frame buffer can be fetched to generate the display so that the secure content is obscured or otherwise not displayed.

It will be noted that the above discussion has described a variety of different systems, components, engines, and/or logic. It will be appreciated that such systems, components, engines, and/or logic can be comprised of hardware items (such as processors and associated memory, or other processing components, some of which are described below) that perform the functions associated with those systems, components, engines, and/or logic. In addition, the systems, components and/or logic can be comprised of software that is loaded into a memory and is subsequently executed by a processor or server, or other computing component, as described below. The systems, components, engines, and/or logic can also be comprised of different combinations of hardware, software, firmware, etc., some examples of which are described below. These are only some examples of different structures that can be used to form the systems, components, engines, and/or logic described above. Other structures can be used as well.

The present discussion has mentioned processors, processing units, and servers. In one example, the processors, processing units, and servers include computer processors with associated memory and timing circuitry, not separately shown. The processors, processing units, and servers are functional parts of the systems or devices to which they belong and are activated by, and facilitate the functionality of the other components or items in those systems.

Also, a number of user interface (UI) displays have been discussed. The UI displays can take a wide variety of different forms and can have a wide variety of different user actuatable input mechanisms disposed thereon. For instance, the user actuatable input mechanisms can be text boxes, check boxes, icons, links, drop-down menus, search boxes, etc. The mechanisms can also be actuated in a wide variety of different ways. For instance, the mechanisms can be actuated using a point and click device (such as a track ball or mouse). The mechanisms can be actuated using hardware buttons, switches, a joystick or keyboard, thumb switches or thumb pads, etc. The mechanisms can also be actuated using a virtual keyboard or other virtual actuators. In addition, where the screen on which the mechanisms are displayed is a touch sensitive screen, the mechanisms can be actuated using touch gestures. Also, where the device that displays the mechanisms has speech recognition components, the mechanisms can be actuated using speech commands.

A number of data stores have also been discussed. It will be noted the data store can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 4:
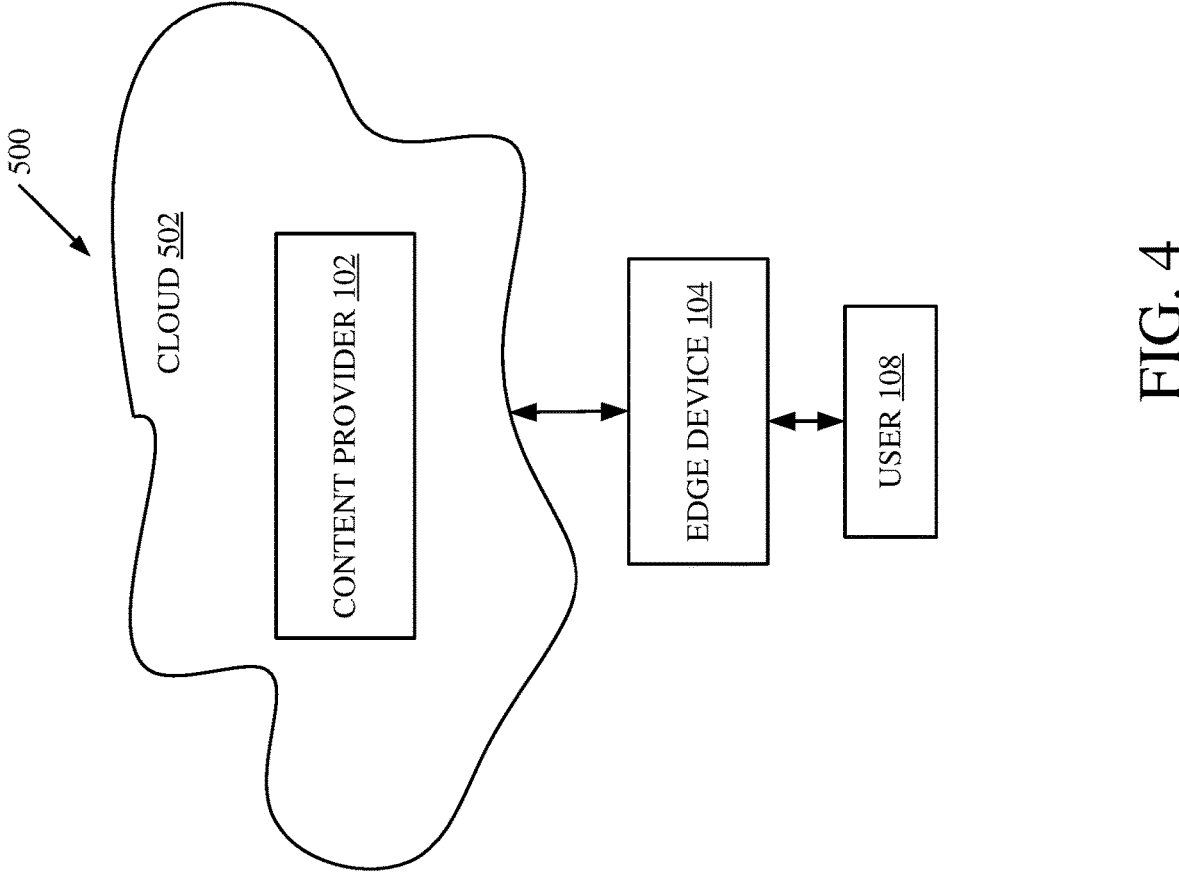
FIG. 4 is a block diagram showing the computing system architecture illustrated in FIG. 1, deployed in a remote server environment.

FIG. 4 is a block diagram of architecture 100, shown in FIG. 1, except that its elements are disposed in a cloud computing architecture 500. Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of architecture 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the example shown in FIG. 4, some items are similar to those shown in FIG. 1 and they are similarly numbered. FIG. 4 specifically shows that content provider 102 can be located in cloud 502 (which can be public, private, or a combination where portions are public while others are private). Therefore, user 108 uses edge device 106 to access those systems through cloud 502.

FIG. 4 also depicts another example of a cloud architecture. FIG. 4 shows that it is also contemplated that some elements of computing system architecture 100 can be disposed in cloud 502 while others are not. By way of example, content provider 102 can be disposed outside of cloud 502, and accessed through cloud 502. Regardless of where the items are located, the items can be accessed directly by device 504, through a network (either a wide area network or a local area network), they can be hosted at a remote site by a service, or they can be provided as a service through a cloud or accessed by a connection service that resides in the cloud. All of these architectures are contemplated herein.

It will also be noted that architecture 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 5:
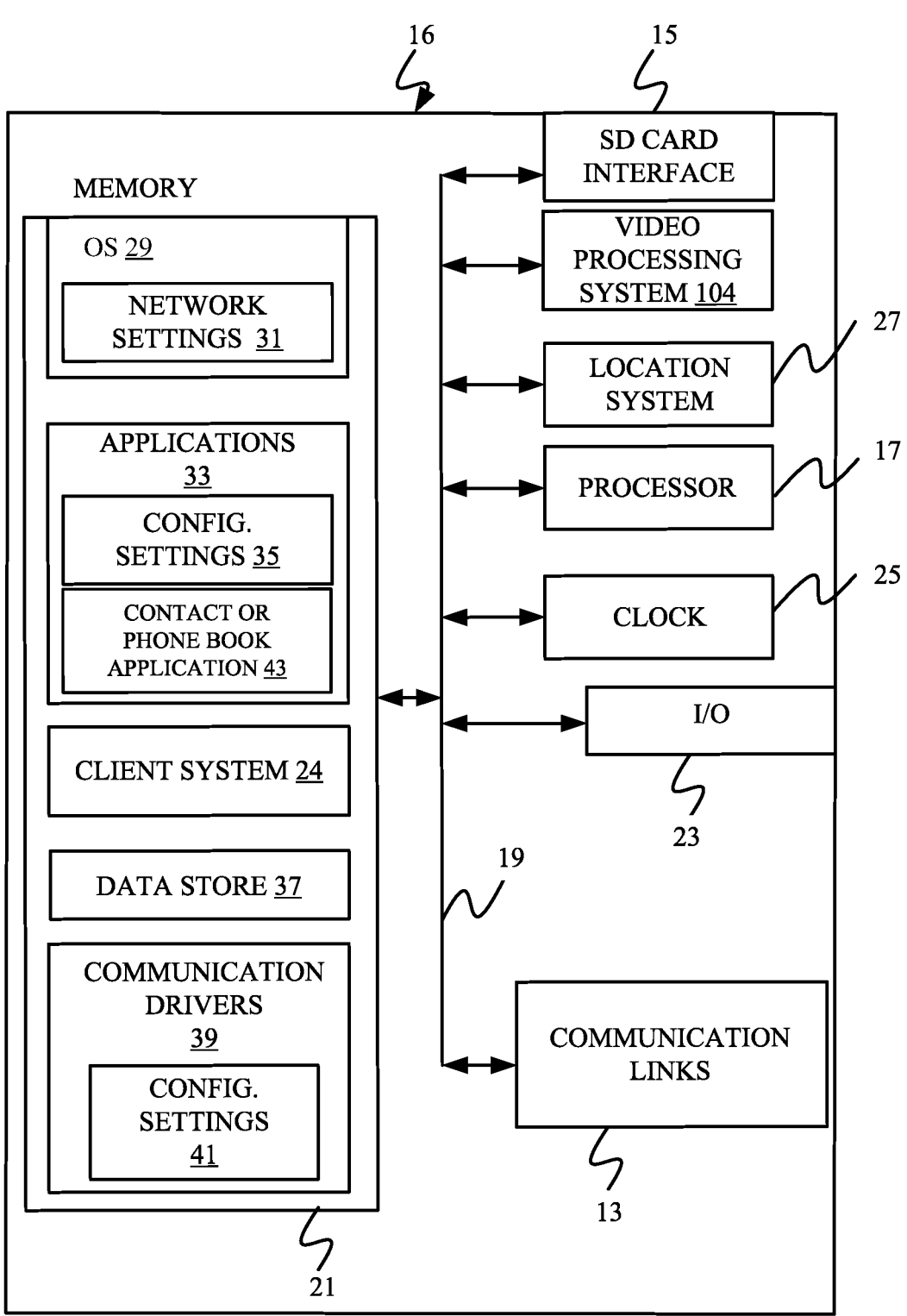
FIGS. 5, 6, and 7 show examples of mobile devices that can be used in the computing system architectures described elsewhere.
Figure 6:
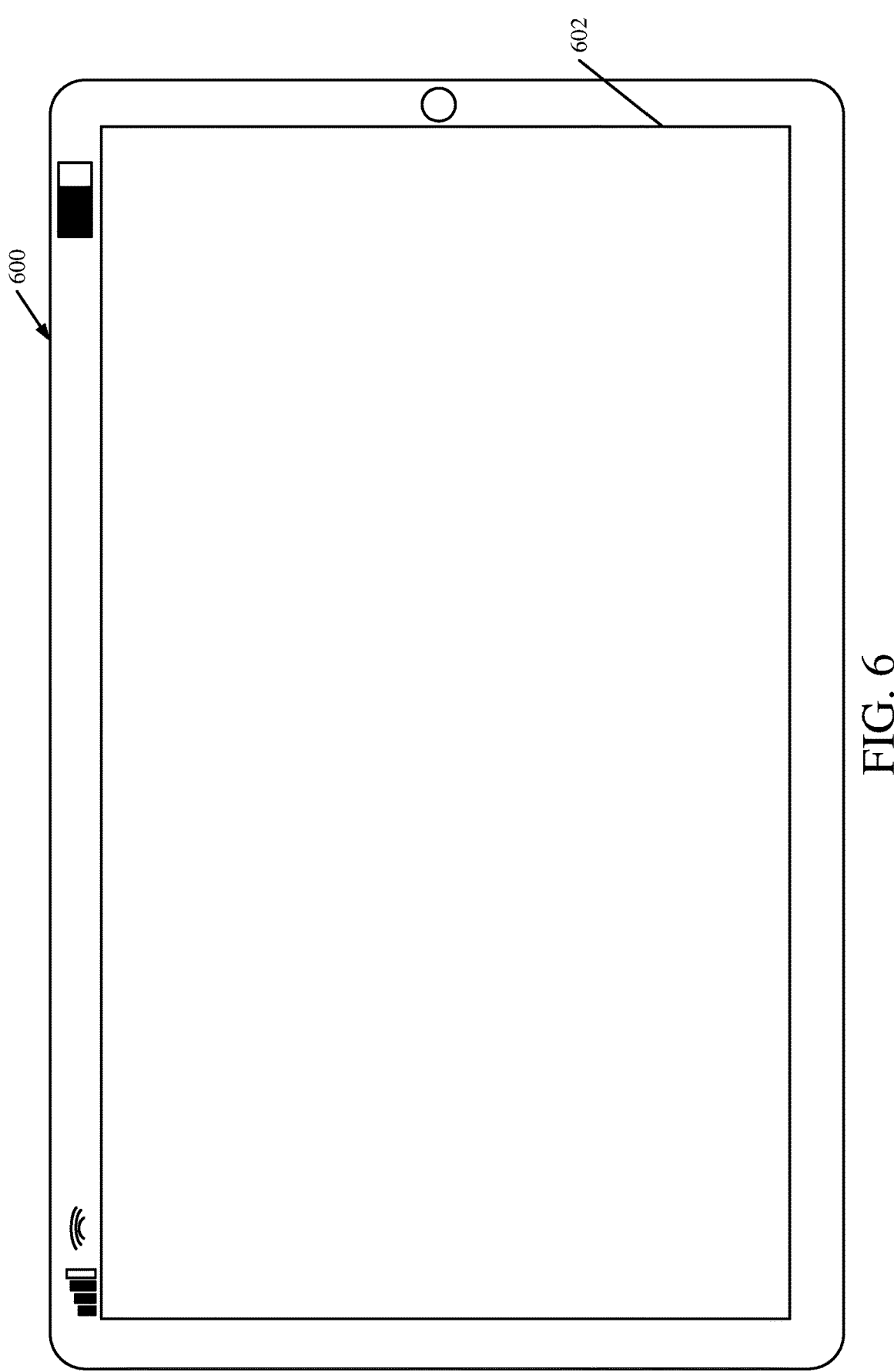
Figure 7:
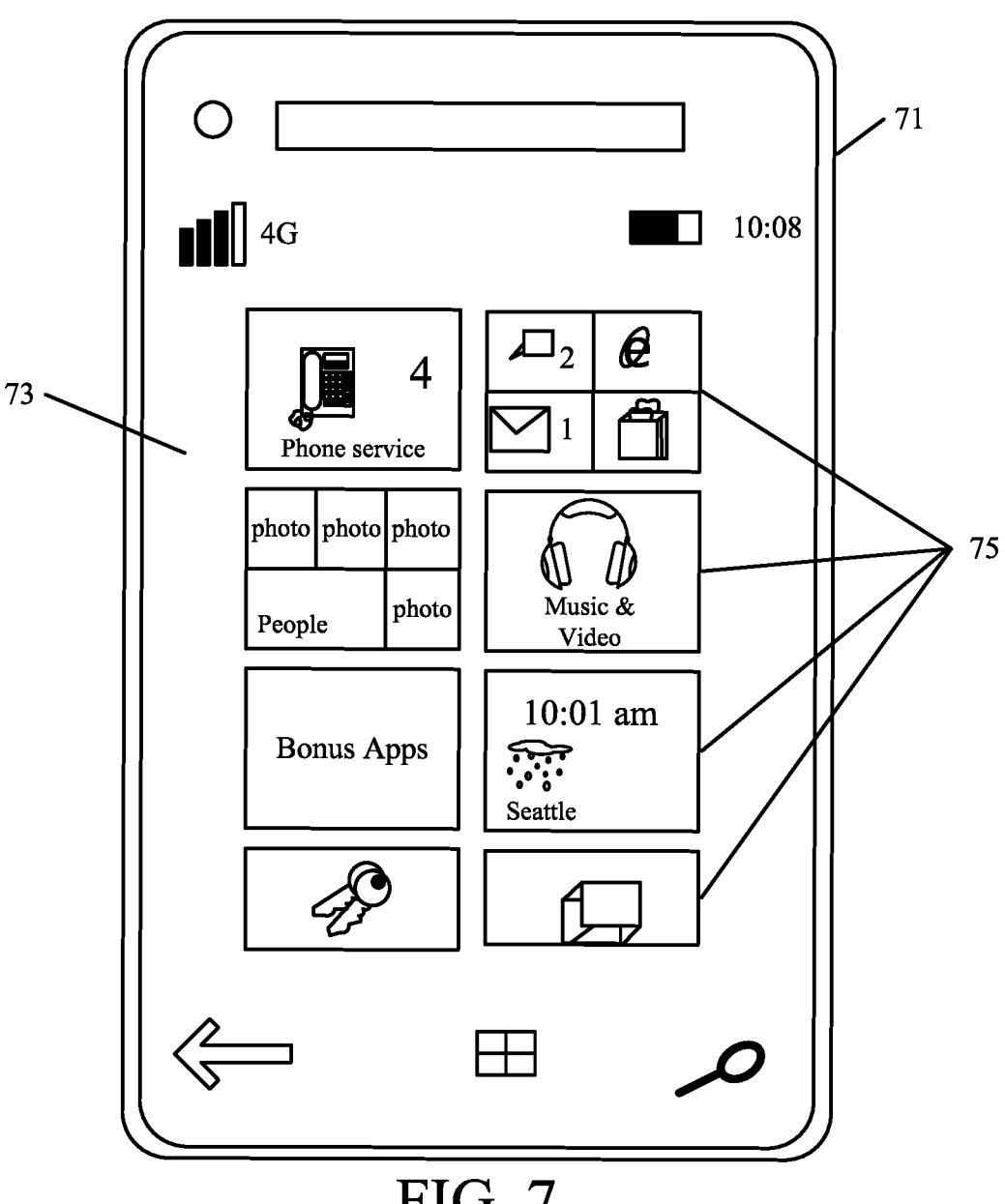

FIG. 5 is a simplified block diagram of one illustrative example of a handheld or mobile computing device that can be used as a user's or client's hand held device 16, in which the present system (or parts of it) can be deployed. FIGS. 6-7 are examples of handheld or mobile devices.

FIG. 5 provides a general block diagram of the components of a client device 16 that can run components computing system architecture 100 or edge device 104 or that interacts with architecture 100, or both. In the device 16, a communications link 13 is provided that allows the handheld device to communicate with other computing devices and under some embodiments provides a channel for receiving information automatically, such as by scanning. Examples of communications link 13 include an infrared port, a serial/ USB port, a cable network port such as an Ethernet port, and a wireless network port allowing communication though one or more communication protocols including General Packet Radio Service (GPRS), LTE, HSPA, HSPA+ and other 3G and 4G radio protocols, 1×rtt, and Short Message Service, which are wireless services used to provide cellular access to a network, as well as Wi-Fi protocols, and Bluetooth protocol, which provide local wireless connections to networks.

In other examples, applications or systems are received on a removable Secure Digital (SD) card that is connected to a SD card interface 15. SD card interface 15 and communication links 13 communicate with a processor 17 (which can also embody processors or servers from other FIGS.) along a bus 19 that is also connected to memory 21 and input/ output (I/O) components 23, as well as clock 25 and location system 27.

I/O components 23, in one example, are provided to facilitate input and output operations. I/O components 23 for various embodiments of the device 16 can include input components such as buttons, touch sensors, multi-touch sensors, optical or video sensors, voice sensors, touch screens, proximity sensors, microphones, tilt sensors, and gravity switches and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a dead reckoning system, a cellular triangulation system, or other positioning system. System 27 can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. Memory 21 can also include computer storage media (described below). Memory 21 stores computer readable instructions that, when executed by processor 17, cause the processor to perform computer-implemented steps or functions according to the instructions. Similarly, device 16 can have a client system 24 which can run various applications or embody parts or all of architecture 100. Processor 17 can be activated by other components to facilitate their functionality as well.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications that have previously been stored on the device 16 or applications that are installed during use, although these can be part of operating system 29, or hosted external to device 16, as well.

FIG. 6 shows one example in which device 16 is a tablet computer 600. In FIG. 6, computer 600 is shown with user interface display screen 602. Screen 602 can be a touch screen (so touch gestures from a user's finger can be used to interact with the application) or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

FIG. 7 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 8:
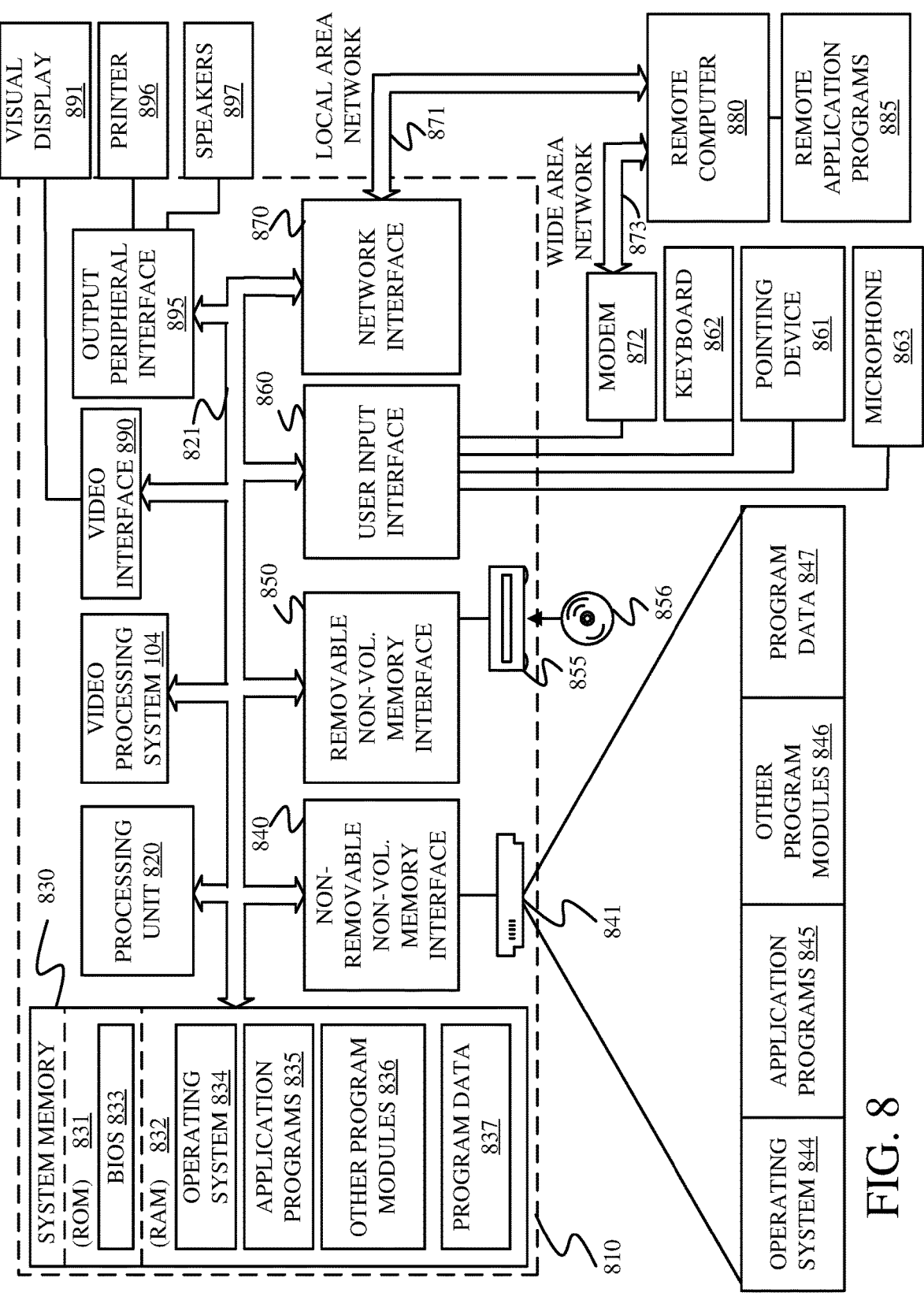
FIG. 8 is a computing environment that can be used in the computing system architecture described elsewhere.

FIG. 8 is one example of a computing environment in which architecture 100, or parts of it. (for example) can be deployed. With reference to FIG. 8, an example system for implementing some embodiments includes a computing device in the form of a computer 810 programmed to operate as discussed above. Components of computer 810 may include, but are not limited to, a processing unit 820 (which can comprise processors or servers from previous FIGS.), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 8.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. Computer storage media includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 8 illustrates operating system 834, application programs 835, other program modules 836, and program data 837.

The computer 810 may also include other removable/non-removable volatile/nonvolatile computer storage media. By way of example only, FIG. 8 illustrates a hard disk drive 841 that reads from or writes to non-removable, nonvolatile magnetic media, and an optical disk drive 855 that reads from or writes to a removable, nonvolatile optical disk 856 such as a CD ROM or other optical media. Other removable/non-removable, volatile/nonvolatile computer storage media that can be used in the example operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FP-GAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 8, provide storage of computer readable instructions, data structures, program modules and other data for the computer 810. In FIG. 8, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 8 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 8 illustrates remote application programs 885 as residing on remote computer 880. It will be appreciated that the network connections shown are examples and other means of establishing a communications link between the computers may be used.

It should also be noted that the different examples described herein can be combined in different ways. That is, parts of one or more examples can be combined with parts of one or more other examples. All of this is contemplated herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer implemented method comprising:
   receiving, by a computing device, video content to be displayed;
   identifying a security level corresponding to the video content;
   storing the video content in a memory category of video memory of the computing device corresponding to the identified security level, the memory category of video memory being one of a plurality of different memory categories of video memory, each memory category corresponding to a different security level; and
   controlling, with a security processing system of the computing device, which video processing components of a plurality of different video processing components of the computing device have access to the video content in the video memory based on the memory category of the video memory in which the video content is stored, wherein the controlling comprises:
      identifying, as a set of allowed video processing components, a subset of the plurality of different video processing components that have access to the video content,
      performing video processing on the video content with the set of allowed video processing components to obtain processed video content, and
      outputting the processed video content for display on a display screen.

2. The computer implemented method of claim 1, wherein controlling which video processing components have access to the video content is further based in part on an importance of an operation performed by the particular video processing component.

3. The computer implemented method of claim 1, wherein storing the video content in the memory category of video memory comprises:
   assigning the video content to a first memory category of the plurality of different memory categories in the video memory based on the security level corresponding to the video content.

4. The computer implemented method of claim 3, wherein controlling which video processing components have access to the video content comprises:
   controlling which video processing components have access to the video content based on where in the video memory the video content is stored.

5. The computer implemented method of claim 3, wherein controlling which video processing components have access to the video content comprises:
   encrypting the video content with an encryption key; and
   controlling which of the video processing components have access to the encryption key based on the memory category of video memory in which the video content is stored.

6. The computer implemented method of claim 1, wherein controlling which video processing components have access to the video content comprises:
   controlling which video processing operations, of a plurality of different video processing operations, the set of allowed video processing components can perform on the video content based on the memory category of video memory in which the video content is stored.

7. The computer implemented method of claim 1, wherein identifying the security level corresponding to the video content comprises:
   identifying a first security level corresponding to a first set of video content;
   identifying a second security level, higher than the first security level, for a second set of video content; and
   identifying a third security level, higher than the second security level, for a third set of video content.

8. The computer implemented method of claim 7, wherein identifying the set of allowed video processing components comprises:
   identifying a first set of allowed video processing components for the first set of video content;
   identifying a second set of allowed video processing components for the second set of video content, the second set of allowed video processing components having fewer video processing components than the first set of allowed video processing components; and
   identifying a third set of allowed video processing components for the third set of video content, the third set of allowed video processing components having fewer video processing components than the second set of allowed video processing components.

9. The computer implemented method of claim 1, wherein performing video processing on the video content with the set of allowed video processing components to obtain processed video content comprises:
   storing processed video content in a first frame buffer in a first memory category of video memory, the first frame buffer, when displayed on a display screen, showing secure content on the display screen; and
   storing processed video content in a second frame buffer in a second memory category of video memory, the processed video content stored in the second frame buffer, when displayed on a display screen, obscuring secure content on the display screen.

10. The computer implemented method of claim 1, wherein the video processing components each run a different set of code and wherein controlling which video processing components have access to the video content comprises:
   controlling whether a given video processing component has access to the video content based on whether the set of code run on the given video processing component comprises trusted code.

11. The computer implemented method of claim 1, wherein performing video processing on the video content with the set of allowed video processing components to obtain processed video content comprises:

generating the processed video content to include, when displayed on a display screen, visual indicia indicating that video content with a first security level is displayed on the display screen and highlighting a location on the display screen where the video content with the first security level is displayed.

12. A computing system, comprising:

a video memory having a first memory category corresponding to a first security level, a second memory category corresponding to a second security level, and a third memory category corresponding to a third security level;

a memory assignment processor configured to identify a security level corresponding to received video content and to store the received video content in a category of the video memory based on the identified security level;

a display pipeline having a plurality of different video processing components communicatively coupled to the video memory via a bus of the computing system; and a security processing system configured to control which video processing components of the plurality of different video processing components in the display pipeline have access to the received video content in the video memory based on the memory category of the video memory in which the received video content is stored, wherein the security processing system comprises:

a fencing processor configured to identify, as a set of allowed video processing components, a subset of the plurality of different video processing components that have access to the received video content, the set of allowed video processing components performing video processing on the received video content to obtain processed video content.

13. The computing system of claim 12, wherein the security processing system is further configured to control which video processing components of the plurality of different video processing components have access based in part on an importance of an operation performed by the particular video processing component.

14. The computing system of claim 12, further comprising: a display generator outputting the processed video content for display on a display screen.

15. The computing system of claim 14, wherein the memory assignment processor is configured to store video content having the first security level in the first memory category, to store video content having the second security level in the second memory category, and to store video content having the third security level in the third memory category.

16. The computing system of claim 15, wherein the security processing system is configured to control which video processing components have access to the received video content based on which memory category in the video memory the received video content is stored in.

17. The computing system of claim 12, wherein the security processing system comprises:

an encryption system configured to encrypt the received video content with an encryption key and control which of the video processing components in the display pipeline have access to the encryption key based on the memory category the received video content is stored in.

18. The computing system of claim 14, further comprising:

a frame buffer controller configured to store processed video content in a first frame buffer in the first memory category, the first frame buffer, when displayed on a display screen, showing secure content on the display screen, and wherein the frame buffer controller is configured to store processed video content in a second frame buffer in a second memory category, the processed video content stored in the second frame buffer, when displayed on a display screen, obscuring secure content on the display screen.

19. The computing system of claim 18, further comprising:

a secure content highlight engine configured to receive a feedback signal from the display generator indicating that the display is generated from the first frame buffer and to generate the processed video content to include, when displayed on a display screen, visual indicia indicating that video content with a first security level is displayed on the display screen and highlighting a location on the display screen where the video content with the first security level is displayed.

20. A video processing system, comprising:

a video memory having a high security level memory category, a medium security level memory category, and a low security memory category;

a memory assignment processor configured to identify a security level corresponding to received video content and to store the received video content in a memory category in the video memory based on the identified security level;

a first video processing component, communicatively coupled to the video memory via a bus, that performs a first video processing operation, the first video processing operation having a first importance in generating a display based on the received video content;

a second video processing component, communicatively coupled to the video memory via the bus, that performs a second video processing operation, the second video processing operation having a second importance in generating the display based on the received video content, the second importance being higher than the first importance; and a security processing system configured to allow the second video processing component to access the received video content stored in the high security level memory category and inhibit the first video processing component from accessing the received video content stored in the high security level memory category, wherein the security processing system comprises:

a fencing processor configured to identify the second video processing component that has access to the received video content stored in the high security level memory category as one of a set of allowed video processing components performing video processing on the received video content stored in the high security level memory category to obtain processed video content.

* * * * *